United States Patent [19]
White

[11] Patent Number: 5,131,496
[45] Date of Patent: Jul. 21, 1992

[54] HUNTER'S TREE SEAT

[76] Inventor: George M. White, 584 Tooting La., Birmingham, Mich. 48009

[21] Appl. No.: 779,338

[22] Filed: Oct. 18, 1991

[51] Int. Cl.⁵ ............................................. A01M 31/02
[52] U.S. Cl. ..................................... 182/187; 108/152
[58] Field of Search ................. 182/187, 188; 108/152

[56] References Cited

U.S. PATENT DOCUMENTS

| | | | |
|---|---|---|---|
| 3,250,235 | 5/1966 | McDonnell | 108/152 |
| 4,150,733 | 4/1979 | Plummer | 182/187 |
| 4,307,672 | 12/1981 | Shikimi | 108/152 |
| 4,730,699 | 3/1988 | Threlkeld | 108/152 |
| 4,784,239 | 11/1988 | Kirkman | 182/187 |

FOREIGN PATENT DOCUMENTS 1360345  3/1964  France ................. 182/187

Primary Examiner—Reinaldo P. Mashado
Attorney, Agent, or Firm—Lyon & Delevie

[57] ABSTRACT

A tree seat comprises a horizontal beam having a rotatable seat at one end thereof and a vertical pin at the other end thereof that is removably journalled in a complementary vertical element that is secured to a tree by a pair of tree encircling straps.

2 Claims, 1 Drawing Sheet

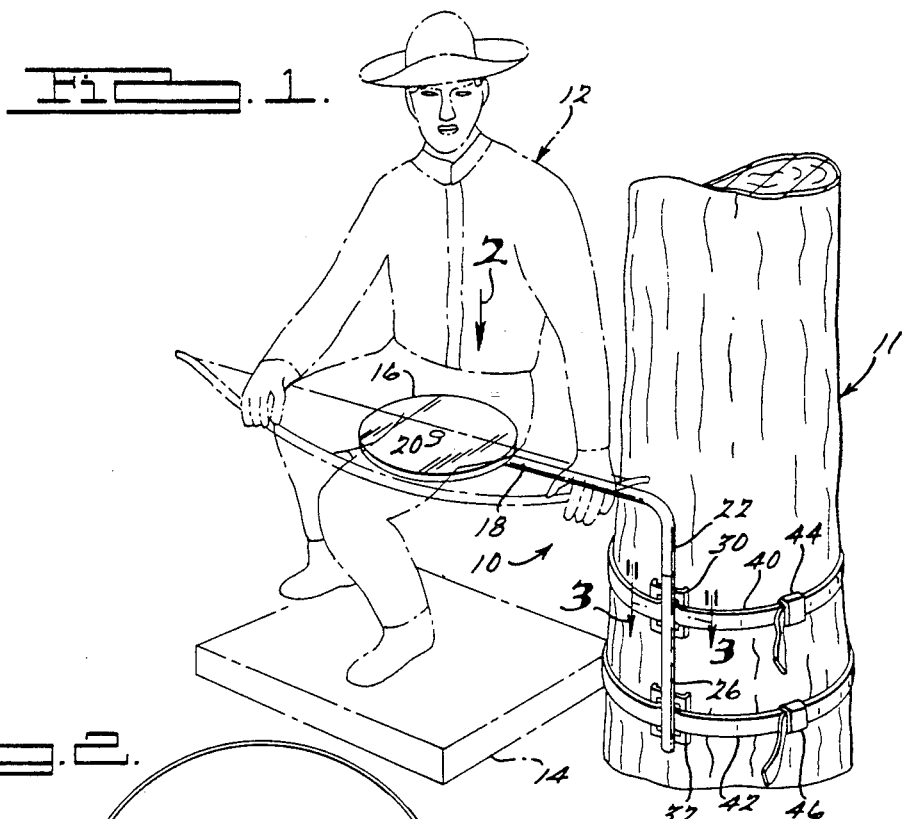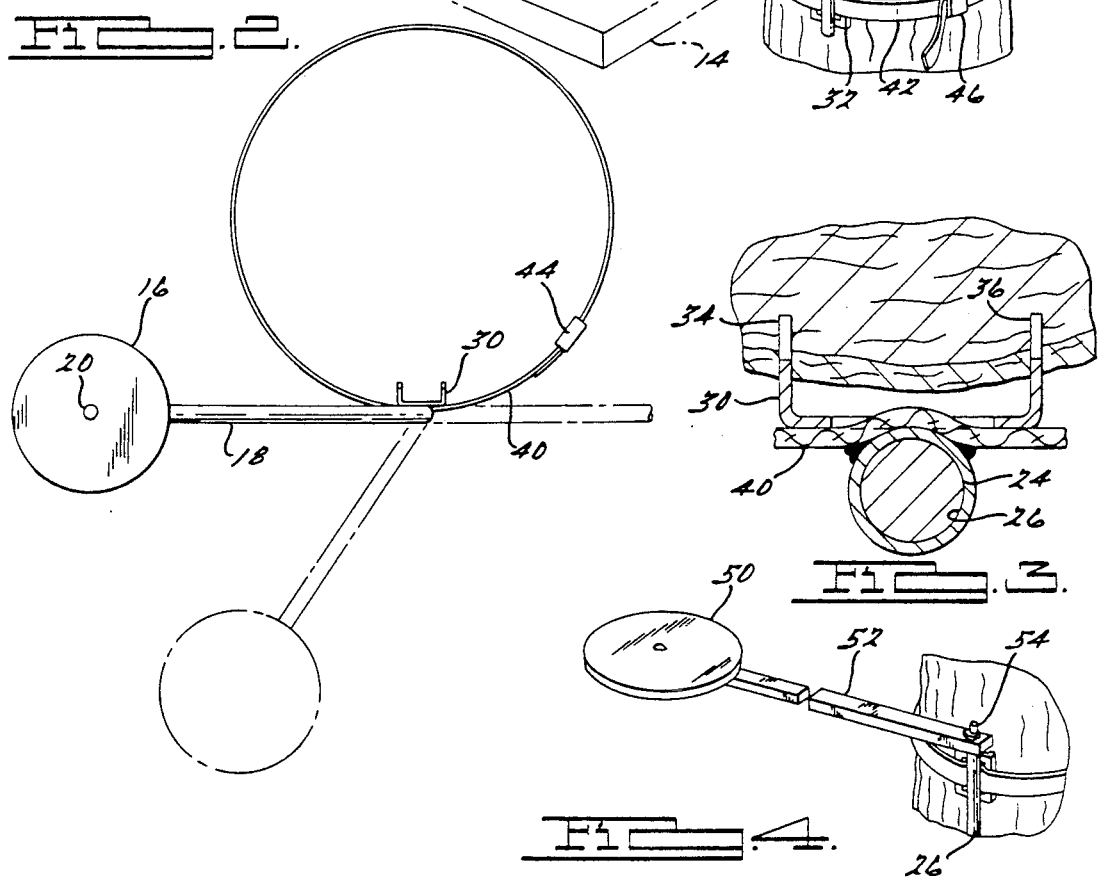

HUNTER'S TREE SEAT

BACKGROUND OF THE INVENTION

Hunting of game from an elevated position, has been legalized in many states. When using a tree to effect elevation of the hunting position, the hunter generally utilizes a platform that is either secured to the tree or is supported by an upright member extending to the ground and running parallel to the tree. In addition to a platform, it is desirable to have a seat since a hunter must position himself in relative silence and in an immobile position for hour after hour awaiting game to cross his path. Such seats are preferably movable to expand the hunters field of vision beyond 180°. Moreover, such tree seats should be movable to a retracted position wherein the seat does not interfere with, for example, drawing an arrow or aiming of a rifle. Thus, it is desirable for a tree seat to swing through an arc of at least 180° to provide the necessary expansion of the hunter's field of vision and as well as to facilitate retraction from the seating position to enable the hunter to release an arrow or fire a gun.

Another desirable feature of a tree stand is that the seat itself be removable to preclude theft and/or weathering of the seat, yet provide for retention of the seat mounting mechanism on the tree to expedite reassembly of the tree stand. Severability of the seat from the tree mounting mechanism also facilitates the use of multiple mounting mechanisms on a plurality of trees within a hunting area. The hunter need only remove the seat from a given mounting mechanism and move it to another tree for use.

It is also imperative that movement of the tree seat be absolutely silent so as to preclude spooking of game. Thus, pivots and other structural supports should be capable of rotation in a grease accepting sleeve or journal as opposed to ratchet or mechanical latching mechanisms that result in sounds upon latching thereof.

SUMMARY OF THE INVENTION

The aforesaid problems are solved, in accordance with an exemplary constructed embodiment of the instant invention, by a seat that is secured at one end of a horizontal beam that is removably and rotatably mounted on a vertical hollow cylinder. The cylinder has a pair of mounting brackets thereon that are attached to a tree by one or more belts having adjustable cinch buckles to facilitate attachment to trees of different diameters. The mounting brackets are of generally U-shaped configuration with teeth on the leg portions thereof that bite into the tree to insure positive engagement therewith.

The beam of the tree seat is provided with a pin that is journalled in the hollow cylinder which comprises, for example, steel tubing. The beam may comprise either a steel tube that is bent to an L-shaped configuration or a straight tube having a vertical pin at the end thereof. The seat may be secured to the seat support beam by one or more bolts, or if it is desirable for the seat to rotate relative to its supporting beam, by a single pin.

BRIEF DESCRIPTION OF THE DRAWING

FIG. 1 is a perspective view of the tree seat of the instant invention in operative position on a tree.

FIG. 2 is a view taken generally in the direction of the arrow 2 of FIG. 1.

FIG. 3 is a view taken along the line 3—3 of FIG. 1.

FIG. 4 is a view, similar to FIG. 1, of a second embodiment of the invention.

DETAILED DESCRIPTION OF A PREFERRED EMBODIMENT OF THE INVENTION

As seen in FIG. 1 of the drawings, a tree seat 10 in accordance with an exemplary constructed embodiment of the instant invention, is shown in operative position on a tree 11. The tree seat 10 is adapted to support the weight of a hunter 12. The hunter 12 may or may not be provided with a platform 14 to facilitate use of a bow and arrow or aiming of a rifle.

In accordance with the present invention, the tree seat 10 comprises a seat 16 that is secured to one end of a mounting beam 18 by a pin 20. An opposite end 22 of the beam 18 is bent downwardly so as to extend parallel to a central axis of the tree 11. A pin 24 is secured to the vertically extending end portion 22 of the beam 18 for acceptance in a complementary bore 25 of a cylinder 26. The cylinder 26 is welded to a pair of mounting brackets 30 and 32. The brackets 30 and 32 are of U-shaped configuration, leg portions 34 and 36 thereof being provided for with teeth for biting engagement of the tree 11. A pair of straps 40 and 42 are connected to the brackets 30 and 32, respectively, and have a pair of buckles 44 and 46 thereon, respectively, to facilitate attachment of the brackets 30 and 32 and cylinder 26 to the tree 11.

As best seen in FIG. 4 of the drawings, a seat 50 is secured to a rectangular beam portion 51 that is telescoped into a relatively larger beam 52 so as to provide for adjustment of the spacing of the seat 16 from the tree 11. The beam portion 52 has a pin 54 at the opposite end thereof that is journalled in the cylinder 26.

In operation, the seat 16 and beam 18 can be pivoted through 180° to facilitate movement by the hunter 12 to opposite sides of the tree 11. As seen in FIG. 2, the seat 16 is secured to the beam 18 by the pin 20 facilitating rotation of the seat 16 to afford the hunter 12 with 360° field of vision. Moreover, pivoting of the seat 16 and the beam 18 relative to the cylinder 26 permits the seat 16 and beam 18 to be swung out of position or vertical alignment above the platform 14 so as to avoid interference with drawing of an arrow or aiming of a rifle.

While the preferred embodiment of the invention has been disclosed, it should be appreciated that the invention is susceptible of modification without departing from the scope of the following claims.

I claim:

1. A hunter's tree seat comprising
   a horizontal beam
   a seat at one end of said beam,
   a vertical pin at the other end of said beam,
   a vertical member having
   means for journalling the pin on said beam,
   a pair of mounting brackets secured to said vertical member in spaced relation, said brackets having tree engaging teeth thereon, and
   a pair of flexible straps secured to said mounting brackets, respectively for encircling a tree.

2. The tree seat of claim 1 wherein said seat is rotatable relative to said beam.